Aug. 2, 1966     R. H. ELWELL     3,263,942
PLASTIC ARTICLES
Filed Oct. 3, 1961
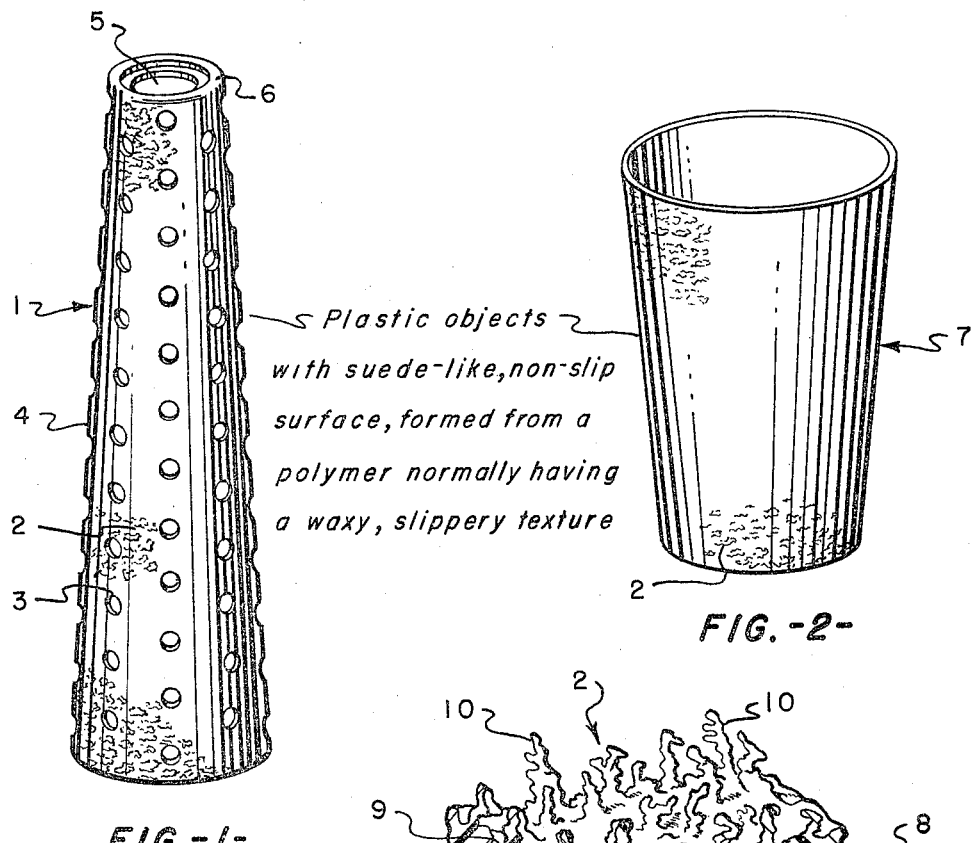
Plastic objects with suede-like, non-slip surface, formed from a polymer normally having a waxy, slippery texture
FIG.-1-
FIG.-2-
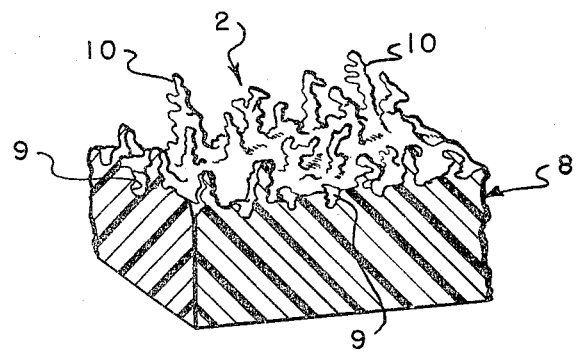
FIG.-3-
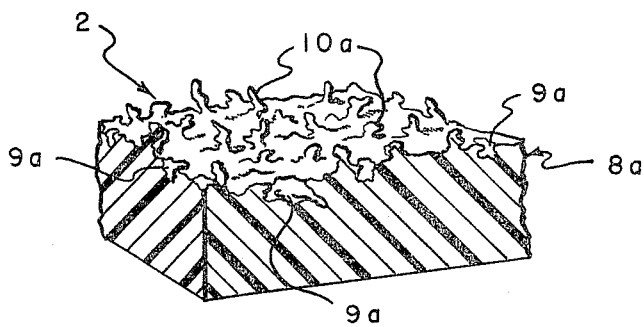
FIG.-4-
INVENTOR.
ROBERT H. ELWELL
BY
ATTORNEY

United States Patent Office 3,263,942
Patented August 2, 1966

3,263,942
PLASTIC ARTICLES
Robert H. Elwell, Spartanburg, S.C., assignor to Deering Milliken Research Corporation, Spartanburg, S.C., a corporation of Delaware
Filed Oct. 3, 1961, Ser. No. 142,603
8 Claims. (Cl. 242—118.32)

This invention relates to plastic articles having a novel non-skid, suede-like surface and to a process for their production.

The waxy, greasy or slippery surface characteristics of many of the plastics presently employed in large amounts is well known. In some end-uses, these characteristics are objectionable but tolerated, e.g., in plastic cups, drinking glasses, toys, handles for tools, etc. In other end-uses, these characteristics limit or preclude their use. To a certain extent, this effect can be overcome by providing the object with geometric patterns such as grooves, ripples or dimples in the surface thereof so that the object does not provide a continuously smooth surface. However, such an expedient is not possible or convenient with certain extrusion moldings and casting moldings and at the very least can increase production costs by reducing the production rate of the costly equipment employed. Also, the undesirable slippery quality of the plastic is not eliminated by providing geometric patterns, but is merely reduced by providing gripping edges to the plastic object.

It is therefore an object of this invention to provide shaped articles of manufacture, formed of a polymer which normally provides a slippery quality to a smooth surface, having a non-skid suede-like surface.

Another object is to provide a method of producing such novel surfaced articles of manufacture.

Other objects will be apparent to those skilled in the art to which this invention pertains.

According to this invention, a shaped plastic article of manufacture which would otherwise have a waxy, slippery texture is provided with a non-skid suede-like texture by sand blasting one or more smooth surfaces of the article.

This invention is illustrated by the accompanying drawings in which—

FIG. 1 is a perspective view of a plastic yarn winding cone having the novel textured surface;

FIG. 2 is a perspective view of a plastic drinking glass having the novel textured surface;

FIG. 3 is a magnified fragmentary cross-sectional view in perspective of a wall of a plastic object showing the novel textured surface thereof in detail; and FIG. 4 is a cross-sectional view similar to FIG. 3 showing a slightly different type of novel textured surface in detail.

As illustrated by FIGS. 1 and 2, the novel textured surface can be provided on a wide variety of plastic objects. FIG. 1 illustrates a yarn winding cone 1 having the novel textured surface 2 and a multiplicity of holes 3 provided in the vertical wall 4 thereof and a larger hole 5 in the top 6 of the cone. FIG. 2 illustrates a plastic drinking cup 7 also having the novel textured surface 2. FIG. 3 is taken from a microscopic view of a portion of a wall 8 of a plastic object and shows the novel textured surface 2 in detail in which the indentations 9 in the surface of the wall 8 and interspersed protuberances 10 thereon are illustrated. FIG. 4 illustrates a wall 8a of another plastic object in which the indentations 9a and protuberances 10a are of a slightly different size, shape and density. Both FIGS. 3 and 4 are illustrative only of the type of indentations and protuberances which are exhibited by objects having the novel textured surface but are not intended to be exact replicas of these elements, which can vary widely in shape and character and still provide the suede-like non-slip properties to the surface.

The indentations and protuberances described above, while uniformly distributed over the textured surface are not geometrically placed along any unit portion of the surface. Rather, their distribution appears to be random and highly irregular when a very small portion of the textured surface is examined microscopically. The density of the indentations and protuberances will vary somewhat, depending on the particular plastic and the selected sand blasting conditions. In general, there will be several hundred to thousands each of such indentations and protuberances per square inch of surface. Relatively hard plastics, e.g., nylon and polypropylene generally will display a lower density than the softer plastics, e.g., polyethylene.

The depth and height of the indentations and protuberances will also vary widely but will ordinarily fall within the range of about 0.001 inch or less to about 0.040 inch or more. Some of the indentations have the appearance of pits or irregular holes while others have the appearance of thin crevices, both filled and unfilled. A microscopic view of a thin cross section of a wall of a textured plastic object will show the typical solid plastic appearance except for about 0.002 to 0.040 inch at the textured surface, which contains the indentations, and which has a milky, opaque and eroded appearance with the protuberances appearing above the milky portion. The protuberances vary widely in appearance but generally varies from thin and hair-like or fern-like to chunky and branched. The softer plastics, e.g., polyethylene, exhibit a greater incidence of the delicate fern-like protuberances.

Surprisingly, it has been found that the effect produced when waxy, slippery polymers are sand blasted is not a rough etched effect such as is obtained when glass, metals or even non-resilient polymers such as styrene or Bakelite are sand blasted. Instead, a soft, suede-like texture is imparted to the surface which substantially eliminates the waxy, slippery or greasy hand ordinarily provided by the resilient polymers employed to produce the novel textured effect. Moreover, under the usual sand blasting conditions, the product is substantially free from imbedded abrasive particles, which is surprising in view of the relatively soft character of the materials which are sand blasted. This textured or three dimensional surface effect is apparently provided by the combination of the minute, very irregularly shaped indentations, i.e., pits or crevices, and minute ragged elongated protuberances, i.e., feathered or frayed hair-like extensions, produced in and on the surface of the plastic object. This unique combination provides not only a non-slip quality but also a soft, pleasing texture to the surface, both of which are highly desirable. Because the protuberances are still firmly attached and part of the body of the plastic object, these surface characteristics are retained during usage.

The sand blasted articles are distinguished from the surface effect produced by abrading with a brush or abrasive wheel by the absence of grooves, furrows and cuts and otherwise uneven surface produced by these abrading means. Also, such means do not provide the desirable suede-like effect observed after sand blasting.

Plastics, which, in the form of smooth surfaced objects, have the undesirable waxy, slippery quality include the hydrocarbon polymers, e.g., polyethylene, polypropylene, formaldehyde polyacetals, e.g., Delrin, nylon, tetrafluoropolyethylenes, e.g., Teflon, chlorotrifluoropolyethylenes, polyvinyl chlorides and the softer, resilient copolymers and terpolymers, e.g., acrylonitrile/butadiene/styrene polymers. Non-resilient, frangible type polymers such as polystyrene and the polyacrylates are not included, as these plastics produce a rough, harsh hand when sand blasted.

Objects formed from the above-described plastics which benefit from having one or more external or internal faces or both provided with the novel textured surface include household and industrial plastic objects which are handled in the wet or dry state including drinking cups and glasses, plates, and objects having plastic handles, e.g., brushes, hammers and screw drivers, children's toys, dolls, banisters and railings, stair treads, bathroom mats and industrial coverings where dry or wet slippery conditions are otherwise apt to be encountered. In the textile industry, there has been a need for yarn winding plastic cones to replace the paperboard type of limited life presently being used and which require frequent replacement. However, when the resilient type plastics needed for this use are molded into cones, their slippery surface precludes their use. Steps or grooves in the surface reduces somewhat the incidence of yarn slippage or displacement on the cone but does not eliminate the undesirable sudden slippage of the last few inches of yarn from the cone during the unwinding operation. The novel textured surface provides plastic cones with all the qualities necessary for commercial textile use.

Another advantage incident with the use of a plastic yarn cone is that if the selected plastic is dimensionally stable to hot or boiling water, the winding cones can also be used as dyeing cones, thus eliminating a winding and unwinding operation, an economy of great importance. Also, the textured surface unexpectedly improves the quality of dyeing due, perhaps to freer dye liquor flow around the first inner layers of yarn because the yarn is not tightly compacted against a smooth surface. Such a dual purpose yarn cone is shown in FIG. 1 and is provided with the optional holes 3 which desirably number from about 50 to 200, preferably about 75 to 125, evenly distributed along the vertical face of the cone. These holes will ordinarily vary from about $1/16''$ to $3/8''$, preferably about $1/8''$ to $1/4''$, and can be circular, oval or rectangular, etc. in shape. Plastic yarn cones which can be provided with the novel textured surface include the standard 9° 36′ and 3° 30′ and the more recent 4° 20′ cones. The high melting high molecular weight polypropylenes and polyformals are the preferred plastics for this dual purpose end use.

The term "sand blasting" is used herein in its generic, i.e., the art of subjecting a surface to high velocity small abrasive particles to provide an irregular, roughened quality thereto. Washed, white sand is preferred to avoid discoloration of the plastic during the sand blasting operation. However, a wide variety of abrasive particles can be used, including Carborundum, glass and metal particles. Conventional particle sizes and velocities are used, e.g., mixes containing particles of which 1.5% are retained by a 0.047″ sieve and 93% are retained by a 0.006″ sieve, or a coarser mix in which 2.5% of the particles are retained by a 0.19″ sieve and 97% retained by a 0.012″ sieve.

A convenient method of producing the textured effect in production is to provide a fixed source of the sand blasting particles located an appropriate distance from a conveyor belt which carries the articles to be sand blasted past the source, while simultaneously rotating the article, thereby uniformly exposing the surface of the plastic article to the abrasive particles. If desired, more than one source of abrasive particles can be provided to improve uniformity and production rates.

What is claimed is:

1. A shaped article of manufacture, formed of a thermoplastic yieldable and essentially non-frangible resilient polymer which has in smooth surfaced form a waxy slippery texture, having at least one face whose surface is substantially uniformly roughened by the presence of minute irregular indentations therein and interspersed random minute elongated ragged flexible protuberances thereon to provide an essentially non-skid, soft, suede-like quality to the surface.

2. An article of manufacture according to claim 1 wherein the polymer is a hydrocarbon.

3. An article of manufacture according to claim 2 wherein the hydrocarbon polymer is polypropylene.

4. An article of manufacture according to claim 2 wherein the hydrocarbon polymer is polyethylene.

5. An article of manufacture according to claim 1 in which the article is a textile yarn winding cone whose outer vertical surface is provided with the non-skid suede-like surface.

6. A textile yarn winding cone according to claim 5 having a multiplicity of holes formed in the outer vertical surface.

7. A textile yarn winding cone according to claim 6 formed from high melting high molecular weight polypropylene.

8. A textile yarn winding cone according to claim 6 formed from high melting, high molecular weight polyformal.

References Cited by the Examiner

UNITED STATES PATENTS

| 1,634,492 | 7/1927 | Dunlap | 242—118.32 |
| 2,429,431 | 10/1947 | Sloan | 242—118.32 |
| 2,636,695 | 4/1953 | Bixby | 242—118.41 |
| 2,983,466 | 5/1961 | Atwood et al. | 242—118.31 |
| 3,015,945 | 1/1962 | Jungbecker | 242—118.1 X |

FOREIGN PATENTS 1,199,760  6/1959  France.

FRANK J. COHEN, *Primary Examiner.*

HARRISON R. MOSELEY, JOSEPH P. STRIZAK, *Examiners.*

G. F. MAUTZ, *Assistant Examiner.*